US008228813B2

(12) United States Patent
Take et al.

(10) Patent No.: US 8,228,813 B2
(45) Date of Patent: Jul. 24, 2012

(54) NETWORK QUALITY MEASUREMENT BASED ON QUALITY MEASUREMENT PACKET (75) Inventors: Yasuo Take, Kawasaki (JP); Kazuo Mizuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 12/340,976

(22) Filed: Dec. 22, 2008

(65) Prior Publication Data

US 2009/0296596 A1 Dec. 3, 2009

(30) Foreign Application Priority Data

May 28, 2008 (JP) ................................. 2008-140122

(51) Int. Cl.
*H04L 12/26* (2006.01)

(52) U.S. Cl. ......................... 370/252; 370/338; 709/224

(58) Field of Classification Search .................. 370/252, 370/253, 352–356; 709/223, 224
See application file for complete search history.

(56) References Cited

U.S. PATENT DOCUMENTS

| 6,853,619 | B1 * | 2/2005 | Grenot ........................... 370/232 |
| 2003/0053419 | A1 * | 3/2003 | Kanazawa et al. ............. 370/252 |
| 2007/0177520 | A1 * | 8/2007 | Morinaga et al. ............. 370/252 |
| 2009/0274224 | A1 * | 11/2009 | Harris ........................... 375/260 |

FOREIGN PATENT DOCUMENTS

JP 2007-208327 8/2008

* cited by examiner

*Primary Examiner* — Pao Sinkantarakorn
(74) *Attorney, Agent, or Firm* — Fujitsu Patent Center (57) ABSTRACT

An apparatus for measuring network quality by use of packets exchanged between a transmission apparatus and a reception apparatus serving as agents arranged in a network includes a unit configured to acquire from the reception apparatus a transmission timing corresponding to a worst quality that is determined by the reception apparatus based on quality data collection packets, the quality data collection packets being transmitted from the transmission apparatus at transmission timing that is successively changed, a unit configured to notify the transmission apparatus of the acquired transmission timing as a transmission timing for transmitting a quality measurement packet, a unit configured to acquire quality information from the reception apparatus, the quality information being measured by the reception apparatus based on the quality measurement packet transmitted from the transmission apparatus, and a unit configured to check the network quality based on the acquired quality information.

10 Claims, 10 Drawing Sheets

NETWORK QUALITY MEASUREMENT BASED ON QUALITY MEASUREMENT PACKET

CROSS-REFERENCE TO RELATED APPLICATIONS

The present application is based upon and claims the benefit of priority from the prior Japanese Patent Application No. 2008-140122 filed on May 28, 2008, with the Japanese Patent Office, the entire contents of which are incorporated herein by reference.

BACKGROUND OF THE INVENTION

1. Field of the Invention

The disclosures herein generally relate to a network quality measurement apparatus, a transmission apparatus, a reception apparatus, and a network quality measurement method for measuring the quality of communication in a network such as the Internet.

2. Description of the Related Art

As a result of the development of network technologies, there has been an increase in the use of real-time-system applications such as stream data delivery and VoIP (Voice Over Internet Protocol) for transmission and reception of audio and video data or the like between apparatuses. When a real-time-system application is used, the quality of audio and video reproduction by the application using received audio and video data is largely affected by network conditions. Because of this, network conditions need to be monitored for the purpose of coping with problems that may occur when the quality of reproduction drops during the system operation.

One way to monitor network condition is to provide an agent for transmitting a large number of measurement packets at constant intervals or in a manner similar to the occurrence pattern of user packets and another agent for receiving these measurement packets in a network. In this active measurement method, network quality between the agents is estimated based on the quality of communication of the measurement packets.

Audio quality may be calculated by use of a standard such as ITU standard ITU-G.107 defined by the ITU (International Telecommunication Union) or TTC standard JJ-201.01 defined by the TCC (Telecommunication Technology Committee). Video quality may be calculated by use of ITU standard ITU-T.241 (ITU-R BT.1720).

With an active measurement method that transmits measurement packets by mimicking the occurrence pattern of user packets, a large number of measurement packets end up being sent in addition to user packets. This gives rise to a problem in that the load on the network increases.

In real-time-system applications such as VoIP and stream delivery, audio and video data to be transmitted are divided into pieces of predetermined unit size, which are then transmitted at predetermined intervals (e.g., 20 ms). When a plurality of terminal apparatuses coincide with each other in terms of their data transmission timing, the load on the network may exhibit periodical imbalances if these apparatuses uses the same network at the same time. As a result, network quality such as the quality of telephone call may fluctuate.

Figure 1:
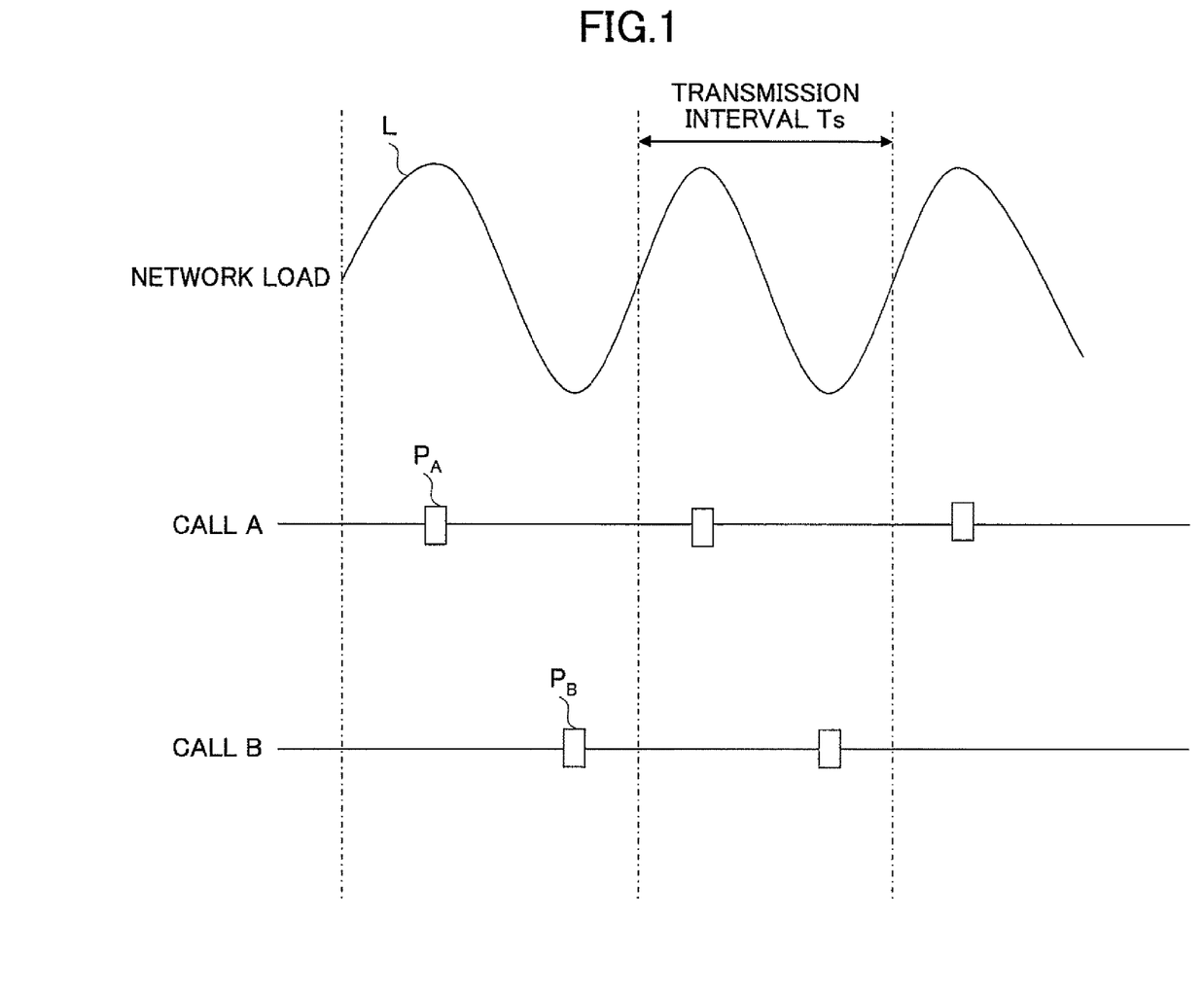
FIG. 1 is a drawing showing an example of packet transmission timing.

FIG. 1 is a drawing showing an example of timing of packet transmission. In this example, VoIP packets are transmitted at transmission interval Ts. Transmission interval Ts may be 20 ms, for example.

A phone call A always uses the first half of VoIP packet transmission interval Ts for transmission of VoIP packets $P_A$. On the other hand, a phone call B always uses the second half of VoIP packet transmission interval Ts for transmission of VoIP packets $P_B$.

When there is an increase in the number of calls utilizing similar transmission timing to the phone call A, the traffic of phone calls increases in the first half of VoIP packet transmission interval Ts, thereby bringing about periodic imbalances in the load L on the network. The interval of imbalances in the load L on the network is equal to the VoIP packet transmission interval Ts. Accordingly, the transmission of VoIP packets $P_A$ at such transmission timing as used by the phone call A results in the delay of VoIP packets $P_A$ or the loss of VoIP packets $P_A$. This causes a drop in communication quality.

In order to measure network quality (i.e., the degree of imbalances in network load) at multiple points (i.e., multiple points in time) within the data transmission interval, a plurality of agents need to be used, and also need to be synchronized with each other in terms of the timing of measurement packet transmission. This is because each agent has fixed transmission timing for transmitting measurement packets. This arrangement is cumbersome.

In order to obviate these two problems described above, Japanese Patent Application Publication No. 2007-208327 discloses a method that completes the measurement of network load (i.e., density distribution defined as variation in the network load over time) at multiple points within the data transmission interval by use of a single agent through a single collection of data. This is done by slightly increasing and decreasing the transmission intervals of measurement packets relative to the data transmission interval.

The measurement method disclosed in the above-noted patent document neither increases network load nor requires the synchronization of measurement packet transmission between multiple agents. This method, however, collects data for multiple points within the data transmission interval, and does not focus attention on a particular point where quality degradation may likely occur. Because of this, this method may not be able to immediately detect degradation in network quality when it happens.

It may thus be desirable to provide a network quality measurement apparatus, a transmission apparatus, a reception apparatus, and a network quality measurement method that can immediately detect degradation in network quality without increasing network load and without the need to establish synchronization of measurement packet transmission between multiple agents.

SUMMARY OF THE INVENTION

According to one aspect of the disclosures herein, an apparatus for measuring network quality by use of packets exchanged between a transmission apparatus and a reception apparatus serving as agents arranged in a network includes a unit configured to acquire from the reception apparatus a transmission timing corresponding to a worst quality that is determined by the reception apparatus based on quality data collection packets, the quality data collection packets being transmitted from the transmission apparatus at transmission timing that is successively changed, a unit configured to notify the transmission apparatus of the acquired transmission timing as a transmission timing for transmitting a quality measurement packet, a unit configured to acquire quality information from the reception apparatus, the quality information being measured by the reception apparatus based on the quality measurement packet transmitted from the transmission apparatus, and a unit configured to check the network quality based on the acquired quality information.

According to another aspect, an apparatus for use in a system for measuring network quality by use of packets exchanged between a transmission apparatus and a reception apparatus serving as agents arranged in a network includes a unit configured to transmit quality data collection packets at transmission timing that is successively changed, and a unit configured to transmit a quality measurement packet at transmission timing that is indicated by a network quality measurement apparatus.

According to another aspect, an apparatus for use in a system for measuring network quality by use of packets exchanged between a transmission apparatus and a reception apparatus serving as agents arranged in a network includes a unit configured to determine a transmission timing corresponding to a worst quality based on quality data collection packets transmitted from the transmission apparatus at transmission timing that is successively changed, and a unit configured to measure quality information based on a quality measurement packet transmitted from the transmission apparatus.

According to another aspect, a system for measuring network quality by use of packets exchanged between a transmission apparatus and a reception apparatus serving as agents arranged in a network includes a transmission apparatus configured to transmit quality data collection packets at transmission timing that is successively changed, and to transmit a quality measurement packet at transmission timing that is indicated by a network quality measurement apparatus, a reception apparatus configured to determine a transmission timing corresponding to a worst quality based on the quality data collection packets received from the transmission apparatus, and to measure quality information based on the quality measurement packet transmitted from the transmission apparatus, and a network quality measurement apparatus configured to acquire the transmission timing corresponding to a worst quality from the reception apparatus, to indicate to the transmission apparatus the acquired transmission timing as the transmission timing for transmitting the quality measurement packet, to acquire the quality information based on the quality measurement packet from the reception apparatus, and to decide network quality based on the acquired quality information.

According to another aspect, a method of measuring network quality by use of packets exchanged between a transmission apparatus and a reception apparatus serving as agents arranged in a network includes acquiring from the reception apparatus a transmission timing corresponding to a worst quality that is determined by the reception apparatus based on quality data collection packets, the quality data collection packets being transmitted from the transmission apparatus at transmission timing that is successively changed, notifying the transmission apparatus of the acquired transmission timing as a transmission timing for transmitting a quality measurement packet, acquiring quality information from the reception apparatus, the quality information being measured by the reception apparatus based on the quality measurement packet transmitted from the transmission apparatus, and checking the network quality based on the acquired quality information.

According to at least one embodiment, the interval for transmitting quality data collection packets between a single pair of agents is changed to estimate a point at which quality degradation may occur, and this estimated point is then monitored by use of a quality measurement packet. This arrangement does not require the synchronization of measurement packet transmission between a plurality of agents, and can immediately detect degradation in network quality.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

<Configuration>

Figure 2:
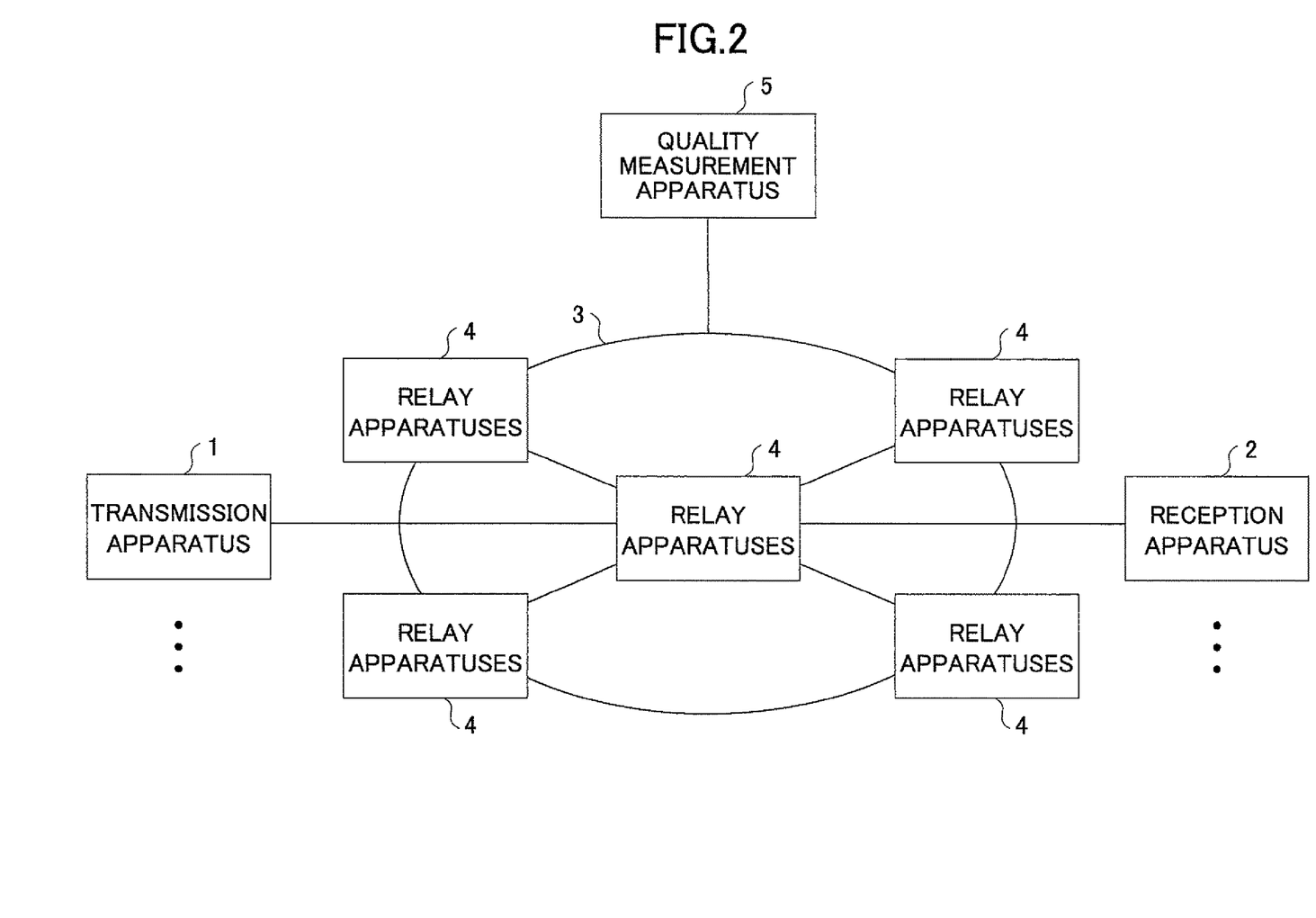
FIG. 2 is a drawing showing an example of the configuration of a system according to an embodiment.

FIG. 2 is a drawing showing an example of the configuration of a system according to an embodiment.

In FIG. 2, a plurality of transmission apparatuses 1 for delivering packets containing stream data such as moving pictures and audio and a plurality of reception apparatuses 2 for receiving the stream-data packets are connected to a network 3 such as the Internet. Among these apparatuses, one pair of a transmission apparatus 1 and a reception apparatus 2 is provided for the purpose of measuring network quality as an agent.

In the network 3, a plurality of relay apparatuses 4 such as Internet routers are provided as intermediary nodes, so that packets transmitted by the transmission apparatuses 1 reach the reception apparatuses 2 by traveling through communication paths including some of the relay apparatuses 4.

A quality measurement apparatus 5 is connected to the network 3 to arrange packet exchange between the transmission apparatuses 1 and the reception apparatuses 2.

Figure 3:
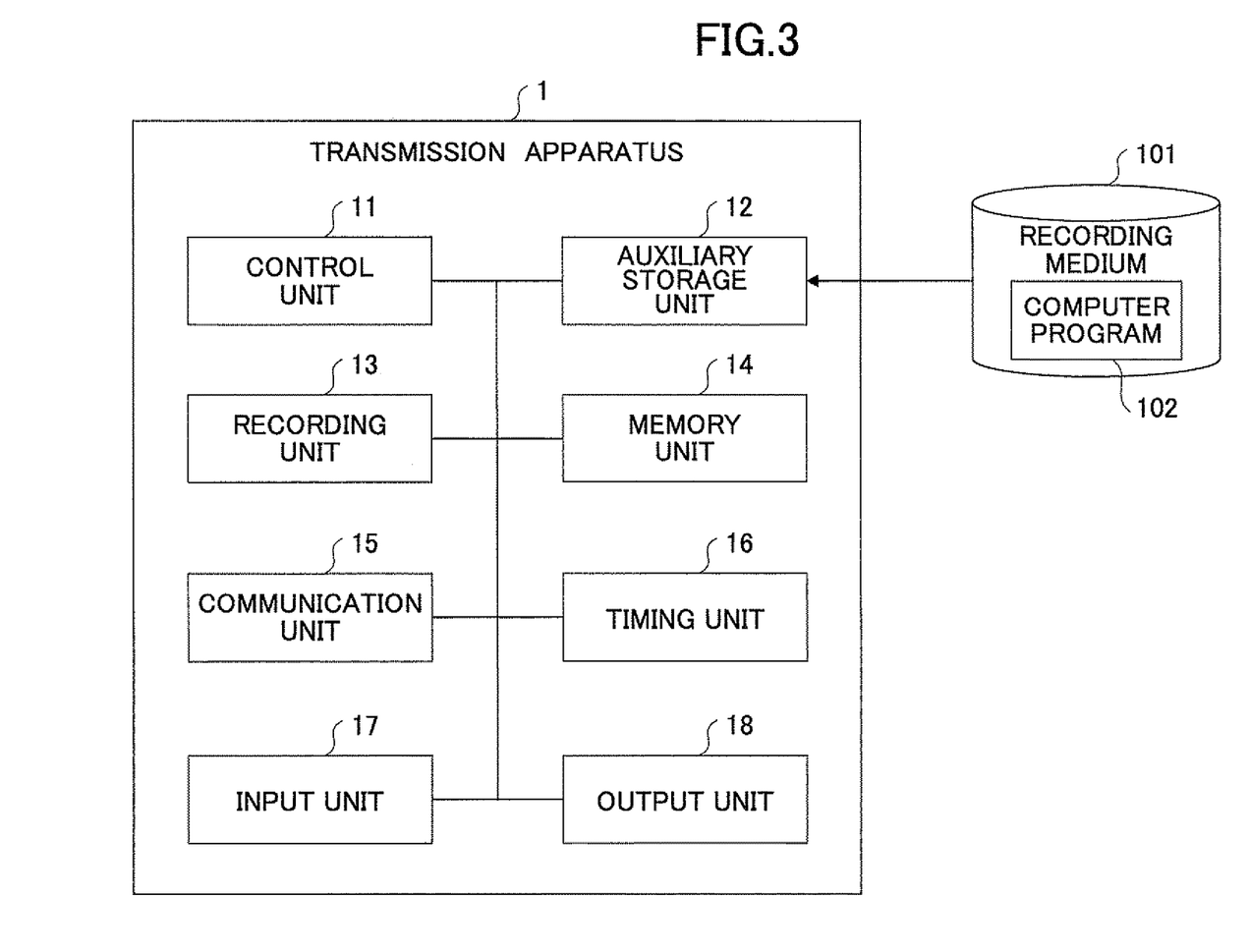
FIG. 3 is a drawing showing an example of the configuration of a transmission apparatus.

FIG. 3 is a drawing showing an example of the configuration of the transmission apparatus 1. The transmission apparatus 1 includes a control unit 11 such as a CPU (Central Processing Unit) for performing the overall control of the transmission apparatus 1 and an auxiliary storage unit 12 for reading various data from a recording medium 101 such as a CD-ROM (Compact Disk-Read Only Memory), which contains therein various recorded information such as data and a computer program 102 executable by the transmission apparatus 1. The transmission apparatus 1 further includes a recording unit 13 such as a hard disk drive for recording various information read by the auxiliary storage unit 12 and a memory unit 14 such as a RAM (Random Access Memory) for temporarily storing various information such as data and the computer program 102 read from the recording unit 13.

The transmission apparatus 1 further includes a communication unit 15 for transmitting and receiving packets, a timing unit 16 for acquiring time, an input unit 17 such as a mouse and keyboard, and an output unit 18 such as a display monitor.

Installment is performed by reading various information such as data and the computer program 102 from the recording medium 101 by use of the auxiliary storage unit 12 for storage in the recording unit 13. At the time of execution, various information such as data and the computer program 102 is read from the recording unit 13 for temporal storage in the memory unit 14, followed by executing steps contained in the computer program 102 by use of the control unit 11. With this arrangement, the transmission apparatus 1 performs desired functions. This example is directed to an IP phone system by which phone calls are made by use of PCs (personal computers). It should be noted that a dedicated terminal device such as an IP telephone set may also be used. In this case, such a dedicated terminal would not include the auxiliary storage unit 12 such as a CD-ROM drive and the input unit 17 such as a mouse and keyboard unrelated to the telephone functions.

Figure 4:
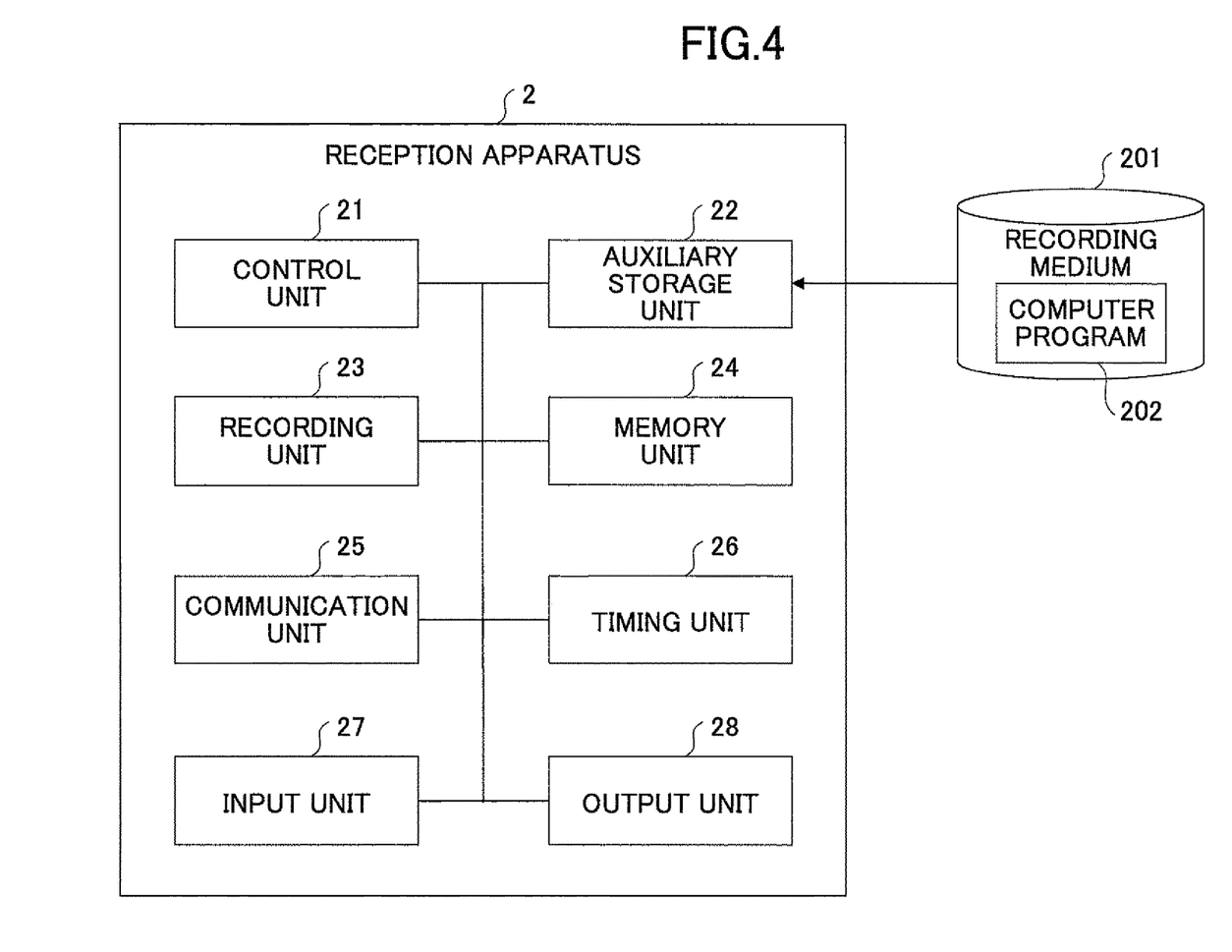
FIG. 4 is a drawing showing an example of the configuration of a reception apparatus.

FIG. 4 is a drawing showing an example of the configuration of the reception apparatus 2. The reception apparatus 2 includes a control unit 21 such as a CPU for performing the overall control of the reception apparatus 2 and an auxiliary storage unit 22 for reading various data from a recording medium 201 such as a CD-ROM, which contains therein various recorded information such as data and a computer program 202 executable by the reception apparatus 2. The reception apparatus 2 further includes a recording unit 23 such as a hard disk drive for recording various information read by the auxiliary storage unit 22 and a memory unit 24 for temporarily storing various information such as data and the computer program 202 read from the recording unit 23.

The reception apparatus 2 further includes a communication unit 25 for transmitting and receiving packets, a timing unit 26 for acquiring time, an input unit 27 such as a mouse and keyboard, and an output unit 28 such as a display monitor.

Installment is performed by reading various information such as data and the computer program 202 from the recording medium 201 by use of the auxiliary storage unit 22 for storage in the recording unit 23. At the time of execution, various information such as data and the computer program 202 is read from the recording unit 23 for temporal storage in the memory unit 24, followed by executing steps contained in the computer program 202 by use of the control unit 21. With this arrangement, the reception apparatus 2 performs desired functions. This example is directed to an IP phone system by which phone calls are made by use of PCs. It should be noted that a dedicated terminal device such as an IP telephone set may also be used. In this case, such a dedicated terminal would not include the auxiliary storage unit 22 such as a CD-ROM drive and the input unit 27 such as a mouse and keyboard unrelated to the telephone functions.

Figure 5:
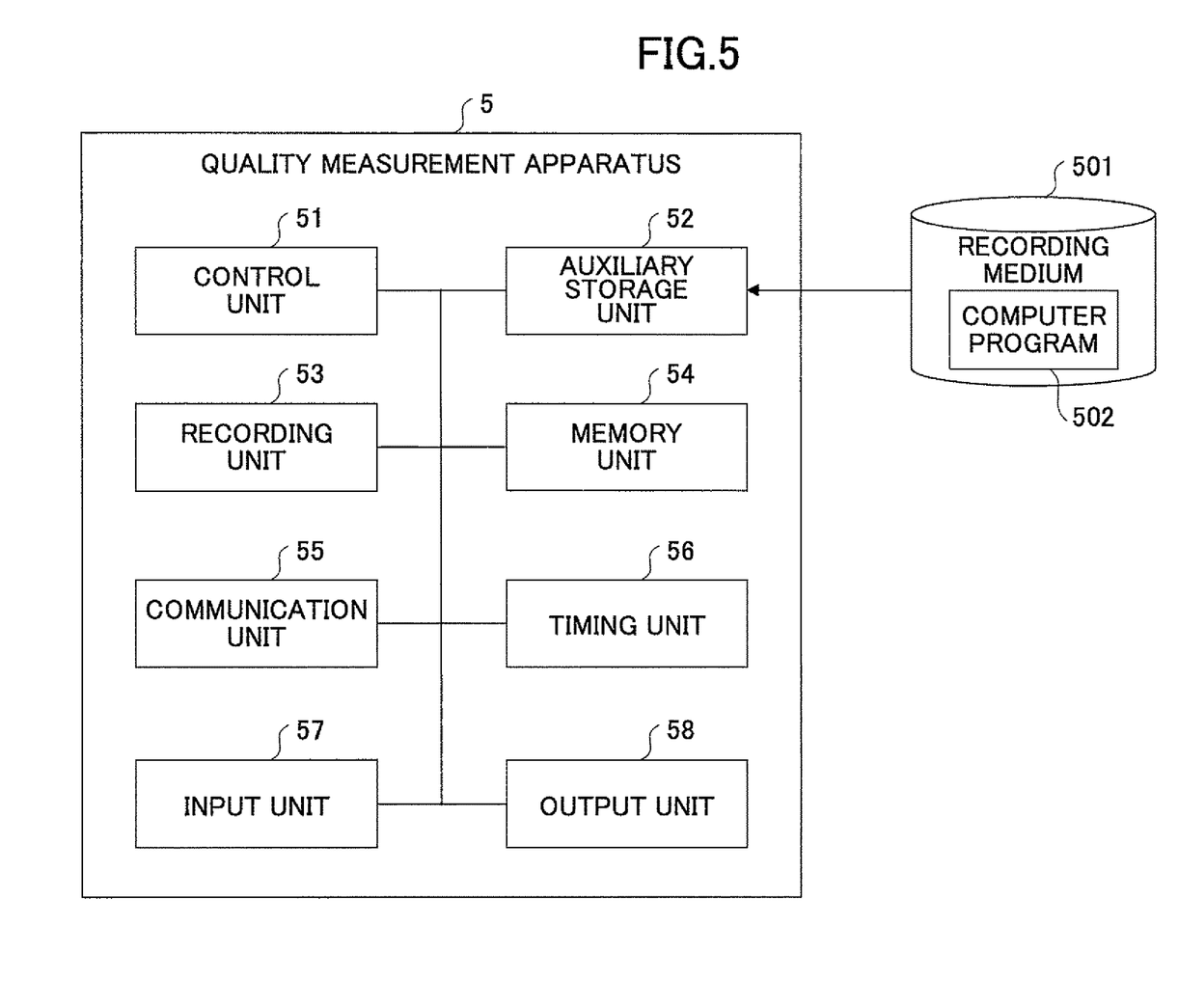
FIG. 5 is a drawing showing an example of the configuration of a quality measurement apparatus.

FIG. 5 is a drawing showing an example of the configuration of the quality measurement apparatus 5. The quality measurement apparatus 5 includes a control unit 51 such as a CPU for performing the overall control of the quality measurement apparatus 5 and an auxiliary storage unit 52 for reading various data from a recording medium 501 such as a CD-ROM, which contains therein various recorded information such as data and a computer program 502 executable by the quality measurement apparatus 5. The quality measurement apparatus 5 further includes a recording unit 53 such as a hard disk drive for recording various information read by the auxiliary storage unit 52 and a memory unit 54 for temporarily storing various information such as data and the computer program 502 read from the recording unit 53.

The quality measurement apparatus 5 further includes a communication unit 55 for transmitting and receiving packets, a timing unit 56 for acquiring time, an input unit 57 such as a mouse and keyboard, and an output unit 58 such as a display monitor.

Installment is performed by reading various information such as data and the computer program 502 from the recording medium 501 by use of the auxiliary storage unit 52 for storage in the recording unit 53. At the time of execution, various information such as data and the computer program 502 is read from the recording unit 53 for temporal storage in the memory unit 54, followed by executing steps contained in the computer program 502 by use of the control unit 51. With this arrangement, the quality measurement apparatus 5 performs desired functions.

<Operation>

In the following, a description will be given of a packet communication method that uses as agents the transmission apparatus 1 and the reception apparatus 2 having the configurations described above. In the following description, a VoIP packet transmission interval Ts is assumed to be 20 ms. However, this is not a limiting example, and the transmission interval Ts is not limited to 20 ms.

Figure 6:
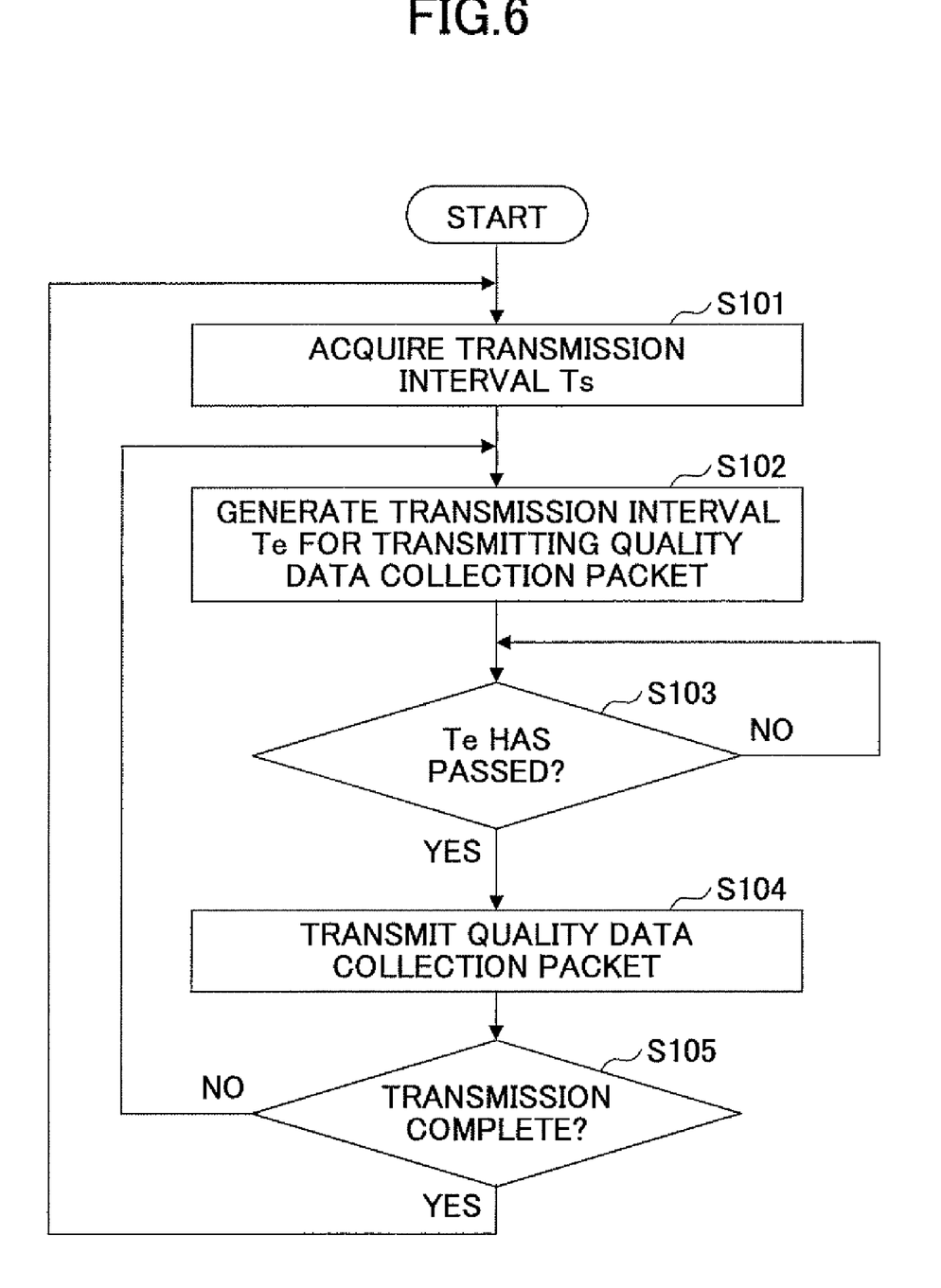
FIG. 6 is a flowchart showing an example of the control procedure performed by a control unit of the transmission apparatus.

FIG. 6 is a flowchart showing an example of the control procedure performed by the control unit 11 of the transmission apparatus 1.

In FIG. 6, upon commencing the procedure, the control unit 11 of the transmission apparatus 1 acquires a VoIP packet transmission interval Ts (step S101). The VoIP packet transmission interval Ts may be received through the input unit 17 of the transmission apparatus 1, or may be received from an external device through the communication unit 15.

The control unit 11 then generates a transmission interval Te by successively adding 1-ms steps from Ts to Ts+ (Ts−1) to obtain an interval for the transmission of quality data collection packets (step S102). Namely, the transmission interval Te is sequentially generated such that Te=Ts, Ts+1, Ts+2, . . . , Ts+19 when the transmission interval Ts is 20 ms.

The control unit 11 checks whether the transmission interval Te has passed (step S103). Upon finding that the transmission interval Te has not yet passed (No in step S103), the control unit 11 is placed in a waiting state until the passage of the interval.

Upon finding that the transmission interval Te has passed (Yes in step S103), the control unit 11 transmits a quality data collection packet (step S104).

After transmitting the quality data collection packet, the control unit 11 checks whether the transmission of a series of quality data collection packets has been completed (step S105). Namely, a check is made as to whether the transmission of the quality data collection packet corresponding to the transmission interval Te being its maximum has been finished.

Upon finding that the transmission of a series of quality data collection packets has not been completed (No in step S105), the control unit 11 returns to the generation of a transmission interval Te (step S102) to repeat the procedure described above.

Upon finding that the transmission of a series of quality data collection packets has been completed (Yes in step S105), the control unit 11 returns to the acquisition of a transmission interval Ts (step S101) to repeat the procedure described above.

Figure 7:
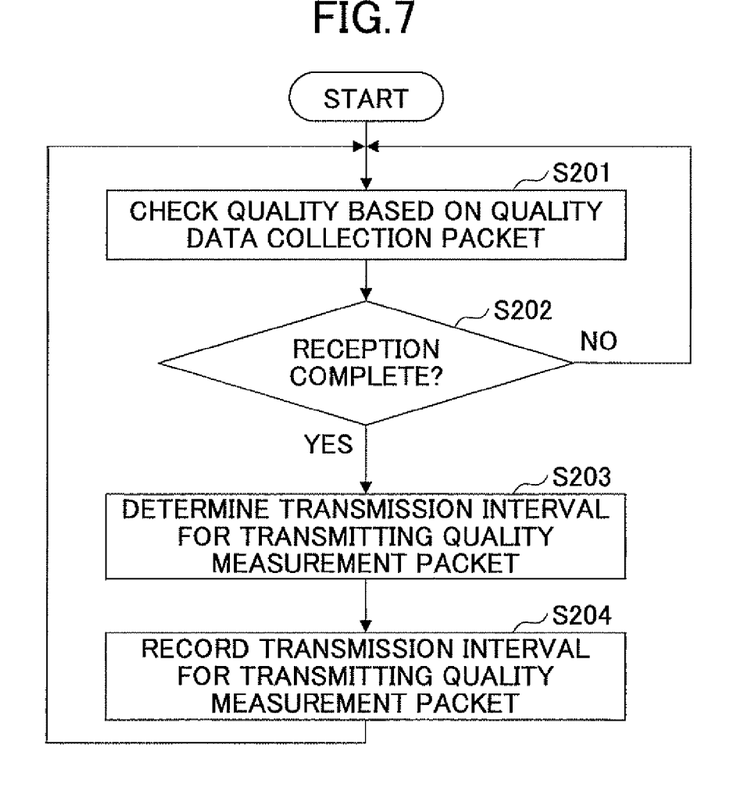
FIG. 7 is a flowchart showing an example of the control procedure performed by a control unit of the reception apparatus.

FIG. 7 is a flowchart showing an example of the control procedure performed by the control unit 21 of the reception apparatus 2.

In FIG. 7, upon commencing the procedure, the control unit 21 of the reception apparatus 2 checks whether the quality data collection packet transmitted from the transmission apparatus 1 at the above-noted timing is excessively delayed and whether this quality data collection packet is successfully received without being lost (step S201). In so doing, the quality of audio is checked based on ITU standard ITU-G.107 or TTC standard JJ-201.01, and the quality of video is checked based on ITU standard ITU-T.241 (ITU-R BT.1720).

The control unit 21 then checks whether the reception of a series of quality data collection packets has been completed (step S202). Namely, a check is made as to whether the reception of the quality data collection packet corresponding to the transmission interval Te being its maximum has been finished.

Upon finding that the reception of a series of quality data collection packets has not been completed (No in step S202), the control unit 21 returns to the quality check (step S201) to repeat the procedure described above.

Upon finding that the reception of a series of the quality data collection packets has been completed (Yes in step S202), the control unit 21 checks the density of network load (the network load L in FIG. 1) based on the check results of the quality data collection packets to see what periodic imbalances exist in the density distribution, thereby determining the transmission interval (i.e., the timing of transmission of a quality measurement packet) corresponding to the highest network load density (step S203).

The control unit 21 then uses the recording unit 23 to record the determined transmission interval (step S204), followed by returning to the quality check utilizing quality data collection packets (step S201) to repeat the procedure described above.

Figure 8:
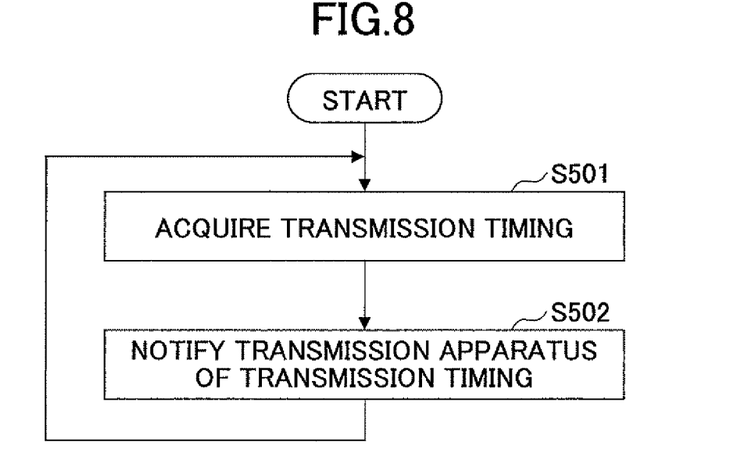
FIG. 8 is a flowchart showing an example of the control procedure performed by a control unit of the quality measurement apparatus.

FIG. 8 is a flowchart showing an example of the control procedure performed by the control unit 51 of the quality measurement apparatus 5.

In FIG. 8, upon commencing the procedure, the control unit 51 of the quality measurement apparatus 5 acquires the transmission timing corresponding to the highest network load density from the reception apparatus 2 (step S501). Namely, the control unit 51 performs polling with respect to the reception apparatus 2 to acquire the transmission timing as a response to the polling.

The control unit 51 then sends to the control unit 11 of the transmission apparatus 1 a notice indicating the acquired transmission timing as a transmission timing for a quality data collection packet (step S502), followed by returning to the acquisition of a transmission timing (step S501) to repeat the procedure described above.

Figure 9:
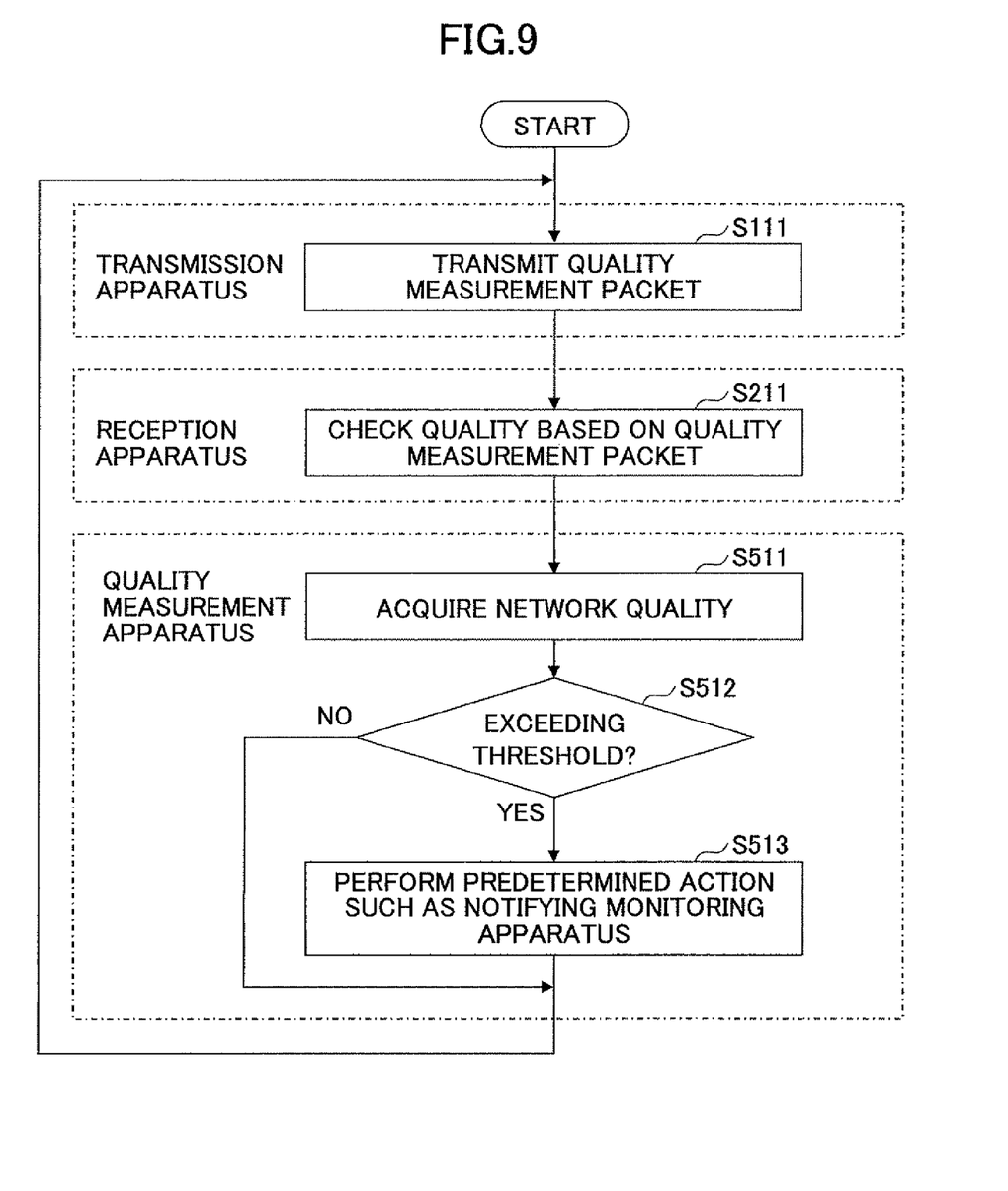
FIG. 9 is a flowchart showing an example of the procedure of checking network quality performed by the transmission apparatus, the reception apparatus, and the quality measurement apparatus.

FIG. 9 is a flowchart showing an example of the procedure of checking network quality performed by the transmission apparatus 1, the reception apparatus 2, and the quality measurement apparatus 5.

In FIG. 9, the transmission apparatus 1 transmits a quality measurement packet at the timing corresponding to the high network density while continuing packet transmission for collecting data regarding the density of network load as described in connection with FIG. 6 (step S111). Namely, the control unit 11 of the transmission apparatus 1 transmits a quality measurement packet at the transmission timing indicated by the quality measurement apparatus 5 in conjunction with the transmission of quality data collection packets described in connection with FIG. 6.

Then, the control unit 21 of the reception apparatus 2 checks whether the quality measurement packet received from the transmission apparatus 1 is excessively delayed and whether this quality measurement packet is successfully received without being lost while continuing the procedure of receiving quality data collection packets as described in connection with FIG. 7, followed by using the recording unit 23 to record the network quality (step S211). In so doing, the quality of audio is checked based on ITU standard ITU-G.107 or TTC standard JJ-201.01, and the quality of video is checked based on ITU standard ITU-T.241 (ITU-R BT.1720).

After this, the control unit 51 of the quality measurement apparatus 5 acquires the network quality from the reception apparatus 2 while performing the procedure described in connection with FIG. 8 (step S511).

The control unit 51 of the quality measurement apparatus 5 checks whether the acquired network quality exceeds a threshold that is set in advance in the quality measurement apparatus 5 (step S512).

If the network quality exceeds the threshold (Yes in step S512), the control unit 51 performs an action specified in advance in the quality measurement apparatus 5, such as an action of notifying an upper-level monitoring apparatus (not shown) (step S513).

The above-described action is repeated through collaboration between the transmission apparatus 1, the reception apparatus 2, and the quality measurement apparatus 5.

Figure 10:
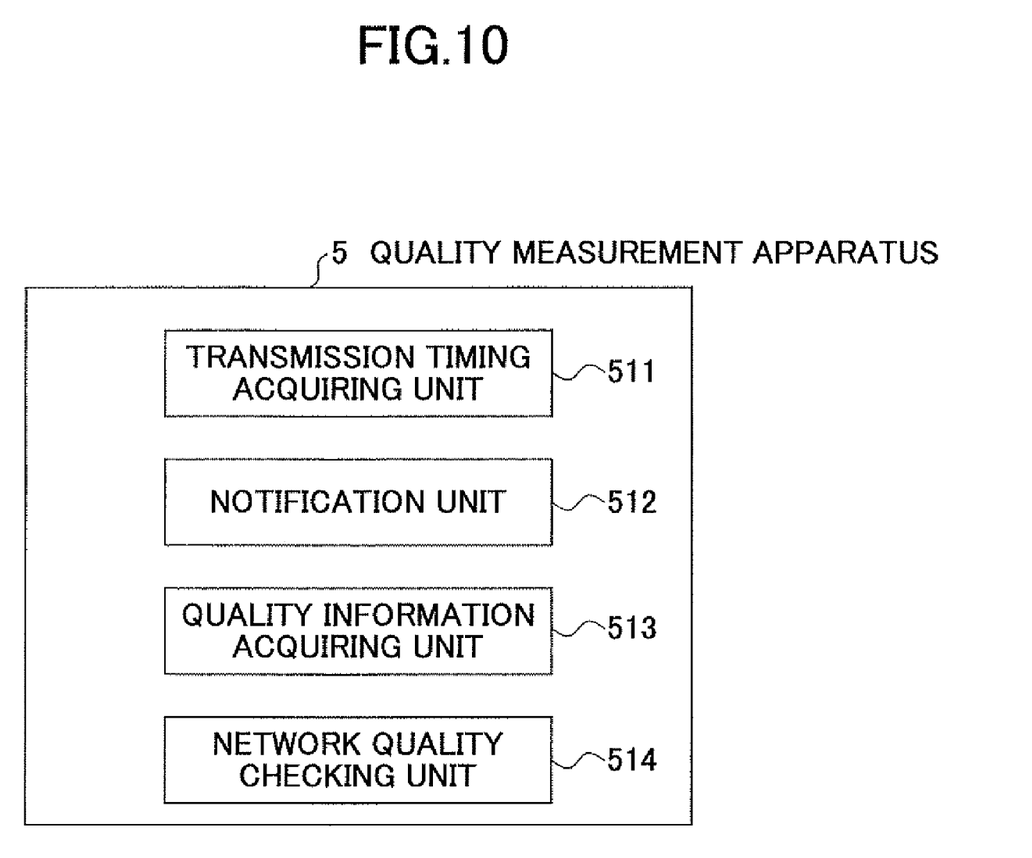
FIG. 10 is a drawing showing an example of the functional block configuration of the quality measurement apparatus.

FIG. 10 is a drawing showing an example of the functional block configuration of the quality measurement apparatus 5. The functions of the functional blocks shown in FIG. 10 are mainly provided by the control unit 51. Communication associated with these functions is performed by the communication unit 55.

A transmission timing acquiring unit 511 acquires from the reception apparatus 2 a transmission timing corresponding to a worst quality that is determined by the reception apparatus 2 based on quality data collection packets. A notification unit 512 notifies the transmission apparatus 1 of the acquired transmission timing as a transmission timing for transmitting a quality measurement packet. A quality information acquiring unit 513 acquires quality information from the reception apparatus 2. A network quality checking unit 514 checks the network quality based on the acquired quality information.

Figure 11:
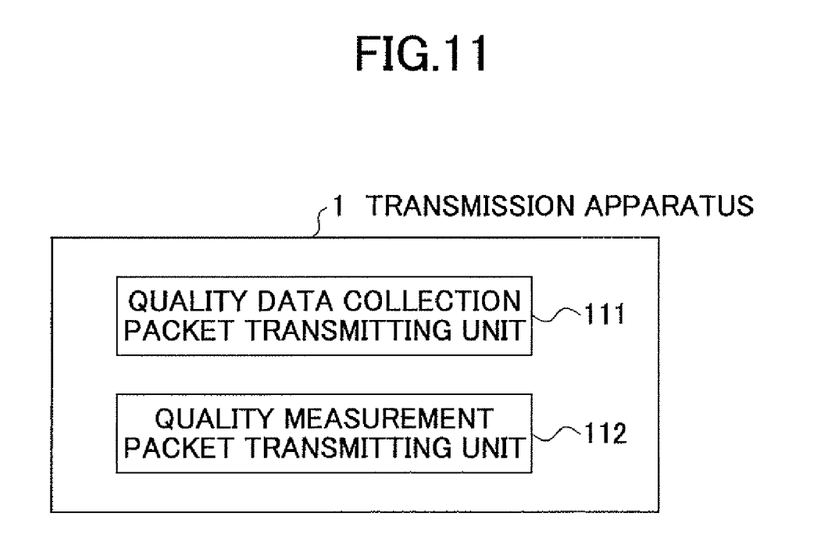
FIG. 11 is a drawing showing an example of the functional block configuration of the transmission apparatus.

FIG. 11 is a drawing showing an example of the functional block configuration of the transmission apparatus 1. The functions of the functional blocks shown in FIG. 11 are mainly provided by the control unit 11. Communication associated with these functions is performed by the communication unit 15.

A quality data collection packet transmitting unit 111 transmits quality data collection packets at transmission timing that is successively changed. A quality measurement packet transmitting unit 112 transmits a quality measurement packet at transmission timing that is indicated by the quality measurement apparatus 5

Figure 12:
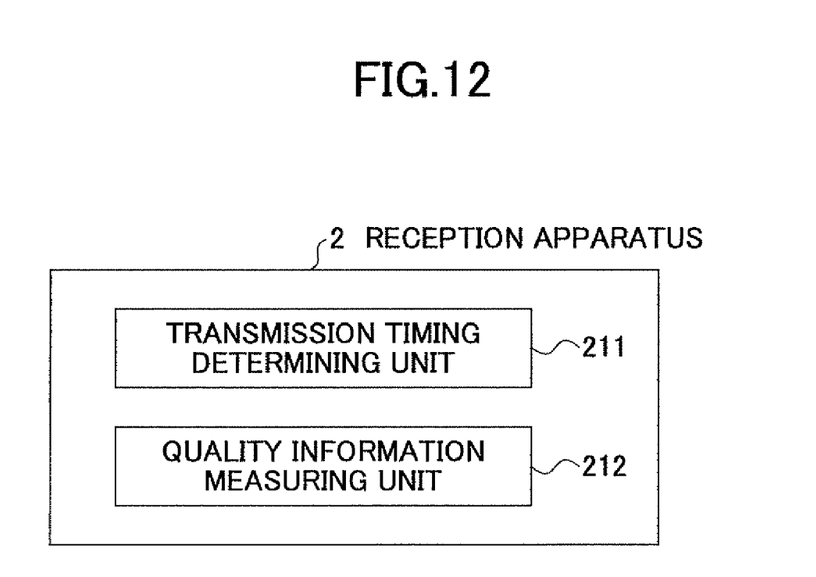
FIG. 12 is a drawing showing an example of the functional block configuration of the reception apparatus.

FIG. 12 is a drawing showing an example of the functional block configuration of the reception apparatus 2. The functions of the functional blocks shown in FIG. 12 are mainly provided by the control unit 21. Communication associated with these functions is performed by the communication unit 25.

A transmission timing determining unit 211 determines a transmission timing corresponding to a worst quality based on quality data collection packets transmitted from the transmission apparatus 1 at transmission timing that is successively changed. A quality information measuring unit 212 measures quality information based on a quality measurement packet transmitted from the transmission apparatus 1.

A description of a method for measuring the quality of video and audio has not been given in the above description since such technology is well known in the art.

According to the disclosures of the embodiments, the interval for transmitting quality data collection packets between a single pair of agents is changed, so that the periodic imbalances of VoIP packet network load is utilized to estimate a point at which quality degradation may occur. This estimated point is then monitored by use of a quality measurement packet. This arrangement does not require the synchronization of measurement packet transmission between a plurality of agents, and can immediately detect degradation in the network quality.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

What is claimed is:

1. An apparatus for measuring network quality by use of packets exchanged between a transmission apparatus and a reception apparatus serving as agents arranged in a network, comprising:
    a unit configured to acquire from the reception apparatus a transmission timing corresponding to a worst quality that is determined by the reception apparatus based on quality data collection packets, the quality data collection packets being transmitted from the transmission apparatus at transmission timing that is successively changed;
    a unit configured to notify the transmission apparatus of the acquired transmission timing as a transmission timing for transmitting a quality measurement packet;
    a unit configured to acquire quality information from the reception apparatus, the quality information being measured by the reception apparatus based on the quality measurement packet transmitted from the transmission apparatus; and
    a unit configured to check the network quality based on the acquired quality information.

2. The apparatus as claimed in claim 1, wherein the transmission timing corresponding to the worst quality determined by the reception apparatus is determined by detecting at least one of a timing corresponding to a largest delay or a timing corresponding to a largest loss rate with respect to the quality data collection packets transmitted from the transmission apparatus at transmission timing that is successively changed.

3. An apparatus for use in a system for measuring network quality by use of packets exchanged between a transmission apparatus and a reception apparatus serving as agents arranged in a network, comprising:
    a unit configured to transmit quality data collection packets at transmission timing that is successively changed; and
    a unit configured to transmit a quality measurement packet at certain transmission timing that is indicated by a network quality measurement apparatus that has acquired the certain transmission timing from the reception apparatus, wherein the certain transmission timing for transmitting the quality measurement packet corresponds to a worst quality determined by the reception apparatus based on the quality data collection packets, the certain transmission timing including timing that causes the worst quality in terms of network load density.

4. The apparatus as claimed in claim 3, wherein the certain transmission timing corresponding to the worst quality determined by the reception apparatus is determined by detecting at least one of a timing corresponding to a largest delay or a timing corresponding to a largest loss rate with respect to the quality data collection packets transmitted at the transmission timing that is successively changed.

5. An apparatus for use in a system for measuring network quality by use of packets exchanged between a transmission apparatus and a reception apparatus serving as agents arranged in a network, comprising:
    a unit configured to determine a transmission timing corresponding to a worst quality based on quality data collection packets transmitted from the transmission apparatus at transmission timing that is successively changed, and to transmit the determined transmission timing so that the transmission apparatus is notified of the determined transmission tinning; and
    a unit configured to measure quality information based on a quality measurement packet transmitted from the transmission apparatus, wherein the quality measurement packet is transmitted from the transmission apparatus at the determined transmission timing corresponding to the worst quality, the determined transmission timing including timing that causes the worst quality in terms of network load density.

6. The apparatus as claimed in claim 5, wherein the determined transmission timing corresponding to the worst quality is determined by detecting at least one of a timing corresponding to a largest delay or a timing corresponding to a largest loss rate with respect to the quality data collection packets transmitted from the transmission apparatus at transmission timing that is successively changed.

7. A system for measuring network quality by use of packets exchanged between a transmission apparatus and a reception apparatus serving as agents arranged in a network, comprising:
    a transmission apparatus configured to transmit quality data collection packets at transmission timing that is successively changed, and to transmit a quality measurement packet at transmission timing that is indicated by a network quality measurement apparatus;
    a reception apparatus configured to determine a transmission timing corresponding to a worst quality based on the quality data collection packets received from the transmission apparatus, and to measure quality information based on the quality measurement packet transmitted from the transmission apparatus; and
    a network quality measurement apparatus configured to acquire the transmission timing corresponding to a worst quality from the reception apparatus, to indicate to the transmission apparatus the acquired transmission timing as the transmission timing for transmitting the quality measurement packet, to acquire the quality information based on the quality measurement packet from the reception apparatus, and to decide network quality based on the acquired quality information.

8. The system as claimed in claim 7, wherein the transmission timing corresponding to the worst quality determined by the reception apparatus is determined by detecting at least one of a timing corresponding to a largest delay or a timing corresponding to a largest loss rate with respect to the quality data collection packets transmitted from the transmission apparatus at transmission timing that is successively changed.

9. A method of measuring network quality by use of packets exchanged between a transmission apparatus and a reception apparatus serving as agents arranged in a network, comprising:

acquiring from the reception apparatus a transmission timing corresponding to a worst quality that is determined by the reception apparatus based on quality data collection packets, the quality data collection packets being transmitted from the transmission apparatus at transmission timing that is successively changed;

notifying the transmission apparatus of the acquired transmission timing as a transmission timing for transmitting a quality measurement packet;

acquiring quality information from the reception apparatus, the quality information being measured by the reception apparatus based on the quality measurement packet transmitted from the transmission apparatus; and checking the network quality based on the acquired quality information.

10. The method as claimed in claim 9, wherein the transmission timing corresponding to the worst quality determined by the reception apparatus is determined by detecting at least one of a timing corresponding to a largest delay or a timing corresponding to a largest loss rate with respect to the quality data collection packets transmitted from the transmission apparatus at transmission timing that is successively changed.

* * * * *